(12) United States Patent
Lindner et al.

(10) Patent No.: US 10,344,128 B2
(45) Date of Patent: Jul. 9, 2019

(54) PROCESS FOR PREPARING POLYMERIC, IONIC IMIDAZOLIUM COMPOUNDS

(71) Applicant: BASF SE, Ludwigshafen (DE)

(72) Inventors: Jean-Pierre Berkan Lindner, Mannheim (DE); Sebastian Koltzenburg, Neustadt (DE); Till Gruendling, Mannheim (DE); Sunghee Son, Mannheim (DE); Rupert Konradi, Ladenburg (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 15/501,365

(22) PCT Filed: Jul. 27, 2015

(86) PCT No.: PCT/EP2015/067104
§ 371 (c)(1),
(2) Date: Feb. 2, 2017

(87) PCT Pub. No.: WO2016/020216
PCT Pub. Date: Feb. 11, 2016

(65) Prior Publication Data
US 2017/0226288 A1    Aug. 10, 2017

(30) Foreign Application Priority Data

Aug. 6, 2014  (EP) .................................. 14180065

(51) Int. Cl.
| | | |
|---|---|---|
| *C08G 12/06* | (2006.01) | |
| *C08G 73/06* | (2006.01) | |
| *C08G 12/04* | (2006.01) | |
| *C08G 73/00* | (2006.01) | |

(52) U.S. Cl.
CPC ......... *C08G 73/0616* (2013.01); *C08G 12/06* (2013.01)

(58) Field of Classification Search
CPC ..................................................... C08G 12/06
USPC .................................................. 528/245, 269
See application file for complete search history.

(56) References Cited

U.S. PATENT DOCUMENTS

| 8,791,271 B2 * | 7/2014 | Siemer ................... C08G 12/06 |
| | | 528/245 |
| 2011/0263810 A1 | 10/2011 | Siemer et al. |

FOREIGN PATENT DOCUMENTS

| WO | WO 99/37276 A1 | 7/1999 |
| WO | WO 2010/072571 A1 | 7/2010 |
| WO | WO 2012/127009 A1 | 9/2012 |

OTHER PUBLICATIONS

International Preliminary Report on Patentability dated Feb. 16, 2017 for PCT Patent Application No. PCT/EP2015/067104.
International Search Report and Written Opinion dated Nov. 11, 2015 for PCT Patent Application No. PCT/EP2015/067104.

* cited by examiner

*Primary Examiner* — Duc Truong
(74) *Attorney, Agent, or Firm* — Oblon, McClelland, Maier & Neustadt, L.L.P.

(57) ABSTRACT

A process for preparing polymeric, ionic compounds comprising imidazolium groups (polymeric, ionic imidazolium compounds for short) comprising reacting an a-dicarbonyl compound, an aldehyde, —at least one amino compound having at least two primary amino groups (referred to as oligoamine), if appropriate an amino compound having only one primary amino group (referred to as monoamine) and a protic acid, wherein the protic acid is placed in the reactor and the oligoamine or the aldehyde and o dicarbonyl compound or the oligoamine, the aldehyde and α-dicarbonyl compound are fed to the protic acid.

15 Claims, No Drawings

PROCESS FOR PREPARING POLYMERIC, IONIC IMIDAZOLIUM COMPOUNDS

The invention relates to a process for preparing polymeric, ionic compounds comprising imidazolium groups (polymeric, ionic imidazolium compounds for short) comprising reacting
an α-dicarbonyl compound,
an aldehyde,
at least one amino compound having at least two primary amino groups (referred to as oligoamine),
if appropriate an amino compound having only one primary amino group (referred to as monoamine) and a protic acid,
wherein the protic acid is placed in the reactor and the oligoamine or the aldehyde and α-dicarbonyl compound or the oligoamine, the aldehyde and α-dicarbonyl compound are fed to the protic acid.

Polymeric imidazolium compounds and processes for preparing them are described for example in WO 99/37276. According to WO 99/37276 polymeric imidazolium compounds are obtained by reaction compounds having two imidazole groups with dibromo compounds. The cationic imidazolium polymers obtained have bromide anions as counterion.

From WO 2010/072571 a new process for preparing polymeric imidazolium compounds is known. According to WO 2010/072571 an α-dicarbonyl compound, an aldehyde, a diamine and a protic acid are reacted. In only one reaction step both, the imidazolium ring system and the polymeric imidazolium is obtained from such starting materials.

The process of WO 2010/072571 still requires further improvements. During the reaction a white precipitate may be formed. Such precipitates would render a production process on commercial scale problematic. It is desired to avoid solids precipitating from the reaction mixture during or after the reaction. Furthermore it is desired to obtain a polymeric imidazolium compound of high molecular weight as easily and efficiently as possible.

It was an object of the present invention to improve the process of WO 2010/072571. With the improved process any precipitates should be avoided.

Accordingly the process as defined above has been found.

To the Starting Compounds of the Process

According to the invention, an α-dicarbonyl compound, an aldehyde, at least one oligoamine and a protic acid are reacted with one another.

The carbonyl groups of the α-dicarbonyl compound and the aldehyde may have also the form of a hemiacetal, acetal, hemiketal or ketal group.

The reaction is a polycondensation. In a polycondensation polymerization occurs with elimination of a low molecular weight compound such as water or alcohol.

In the present case, water is eliminated in case of carbonyl groups. To the extent the carbonyl groups have the form of a ketal or hemiketal, acetal or hemiacetal group, an alcohol is eliminated instead of water.

In a preferred embodiment of the present invention the carbonyl groups are present as such and do not have the form of a hemiacetal, acetal, hemiketal or ketal group.

The term α-dicarbonyl compound, aldehyde, oligoamine, monoamine or protic acid as used herein includes a mixture of various-dicarbonyl compounds, various aldehydes, various oligoamines, various monoamines or various protic acids.

To the α-Dicarbonyl Compound

The α-dicarbonyl compound is preferably a compound of the formula I

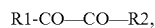

R1-CO—CO—R2, where R1 and R2 are each, independently of one another, an H atom or an organic radical having from 1 to 20 carbon atoms. The radicals can be branched or unbranched or comprise functional groups which can, for example, contribute to further crosslinking of the polymeric imidazolium compound. In particular, R1 and R2 are hydrocarbon radicals having the indicated number of carbon atoms.

The compound is particularly preferably glyoxal.

To the Aldehyde

For the purposes of the present invention, an aldehyde is a compound having at least one aldehyde group. The aldehyde is in particular an aldehyde of the formula II

R3-CHO, where R3 is an H atom or an organic radical having from 1 to 20 carbon atoms. Particular preference is given to formaldehyde; the formaldehyde can also be used in the form of compounds which liberate formaldehyde, e.g. paraformaldehyde or trioxane.

To the Oligoamine

The oligoamine may preferably be represented by the general formula III

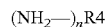

$(NH_2—)_n R4$ where n is an integer greater than or equal to 2 and indicates the number of amino groups. n can assume very large values, e.g. n can be an integer from 2 to 10 000, in particular from 2 to 5000. Very high values of n are present, for example, when polyamines such as polyvinylamine are used.

When compounds having n=2 (diamines) are used in the reaction according to the invention, linear, polymeric imidazolium compounds are formed, while in the case of amines having more than two primary amino groups, branched polymers are formed.

In a preferred embodiment, n is an integer from 2 to 6, in particular from 2 to 4. Very particular preference is given to n=2 (diamine) or n=3 (triamine). Very particular preference is given to n=2.

R4 is any n-valent organic radical. The n-valent organic radical can be the radical of a polymer, e.g. a polyvinylamine as mentioned above, and then has a correspondingly high molecular weight.

The organic radical can comprise not only carbon and hydrogen but also heteroatoms such as oxygen, nitrogen, sulfur or halogens, e.g. in the form of functional groups such as hydroxyl groups, ether groups, ester groups, amide groups, aromatic heterocycles, keto groups, aldehyde groups, primary or secondary amino groups, imino groups, thioether groups or halide groups.

In a preferred embodiment, the amino compound may comprise ether groups, secondary or tertiary amino groups and apart from these no further functional groups. Mention may be made of, for example, polyether amines.

R4 is most preferably a pure hydrocarbon radical or a hydrocarbon radical interrupted or substituted by ether groups, secondary amino groups or tertiary amino groups. In a particular embodiment, $R^4$ is a pure hydrocarbon radical and does not comprise any functional groups.

The hydrocarbon radical can be aliphatic or aromatic or comprise both aromatic and aliphatic groups.

Oligoamines may for example be diamines, in which the primary amino groups are bound directly to an aliphatic group, an aromatic ring system, e.g. a phenylene or naphthylene group, or amino compounds in which the primary amino groups are bound to aliphatic groups as alkyl substituents of an aromatic ring system.

Particularly preferred oligoamines are diamines, in which the primary amino groups are bound to an aliphatic hydrocarbon radical, preferably an aliphatic hydrocarbon radical having from 2 to 50 carbon atoms, particularly preferably from 3 to 40 carbon atoms.

Diamines which may be mentioned are, in particular, C2-C20-alkylenediamines such as 1,4-butylenediamine or 1,6-hexylenediamine.

To Other Starting Materials

In the process of the invention, it is possible to use further compounds, e.g. in order to introduce specific end groups into the polymer or bring about additional crosslinking by means of further functional groups, to set defined properties or to make further reactions on the resulting polymer (polymer-analogous reactions) at a later point in time possible.

Thus, if desired, it is possible to use, for example, monoamines in order to influence the molecular weight of the polymeric imidazolium compounds. The compound having only one primary amino group leads to chain termination and then forms the end group of the polymer chain concerned. The higher the proportion of the monoamine, the lower is the molecular weight.

To the Protic Acid

The protic acid may be represented by the formula $Y^{m-}$ $(H^+)_m$, where m is a positive integer. It can also be a polymeric protic acid, e.g. polyacrylic acid; in this case, m can assume very high values. As such polymeric protic acids, mention may be made of, for example, polyacrylic acid, polymethacrylic acid or a copolymer of (meth)acrylic acid, maleic acid, fumaric acid or itaconic acid with any other monomers, e.g. with (meth)acrylates, vinyl esters or aromatic monomers such as styrene, or another polymer having a plurality of carboxyl groups.

In a preferred embodiment, m is an integer from 1 to 4, particularly preferably 1 or 2. In a particular embodiment, m is 1.

The anion $Y^{m-}$ of the protic acid forms the counterion to the imidazolium cations of the polymeric imidazolium compound.

The anion of a protic acid is preferably the anion of a protic acid having a $pK_a$ of at least 1, in particular at least 2 and in a very particularly preferred embodiment at least 4 (measured at 25° C., 1 bar, in water or dimethyl sulfoxide).

The $pK_a$ is the negative logarithm to the base 10 of the acid constant, $K_a$.

The $pK_a$ is for this purpose measured at 25° C., 1 bar, either in water or in dimethyl sulfoxide as solvent; it is therefore sufficient, according to the invention, for an anion to have the corresponding $pK_a$ either in water or in dimethyl sulfoxide. Dimethyl sulfoxide is used particularly when the anion is not readily soluble in water. Information on the two solvents may be found in standard reference works.

The protic acid is therefore preferably not a protic acid of the halogens which have a $pK_a$ of less than 1; in particular, it is not HCl and not HBr and the anion is correspondingly not chloride or bromide.

Preferred protic acids are carboxylic acids, sulfonic acids, phosphoric acids or phosphonic acids.

As phosphoric acid mention may be made of, in particular, compounds of the formula IV

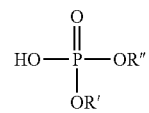

where R' and R'' are each, independently of one another, hydrogen or a C1-C10-, preferably C1-C4-alkyl group.

As phosphonic acid mention may be made of, in particular, compounds of the formula V

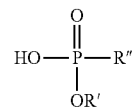

where R' and R'' are each, independently of one another, hydrogen or a C1-C10-, preferably C1-C4-alkyl group.

Preferably, the protic acid is a carboxylic acid with one or more, in particular with one to three carboxylic acid groups; most preferred are carboxylic acids with one carboxylic acid group.

Preferred carboxylic acids have from 1 to 20 carbon atoms and comprise one or two carboxylic acid groups.

The carboxylic acids may be aliphatic or aromatic compounds. Here, aromatic compounds are compounds comprising aromatic groups. Particular preference is given to aliphatic or aromatic carboxylic acids which apart from the oxygen atoms of the carboxylic acid groups group comprise no further heteroatoms or at most comprise one or two hydroxyl groups, carbonyl groups or ether groups.

Most preferred are aliphatic or aromatic carboxylic acids which comprise no further heteroatoms in addition to the oxygen atoms of the carboxylic acid group.

As carboxylic acid having two carboxylic acid groups for example phthalic acid, isophthalic acid, of C2-C6-dicarboxylic acids, e.g. oxalic acid, malonic acid, succinic acid, glutaric acid, adipic acid may be mentioned.

As carboxylic acid having one carboxylic acid group, mention may be made of aliphatic, aromatic, saturated or unsaturated C1-C20-carboxylic acids, in particular alkanecarboxylic acids, alkenecarboxylic acids, alkynecarboxylic acids, alkadienecarboxylic acids, alkatrienecarboxylic acids, hydroxycarboxylic acids or ketonecarboxylic acids or aromatic carboxylic acids such as benzoic acid or phenylacetic acid. Suitable alkanecarboxylic acids, alkenecarboxylic acids and alkadienecarboxylic acids are also known as fatty acids.

Examples are benzoic acid and C1-C20-alkanecarboxylic acids, which may optionally be substituted by one or two hydroxy groups, preferably one hydroxy group.

Particular preference given to the benzoic acid and C2-C20-alkanecarboxylic acids, in particular the acetic acid and propionic acid, with very particular preference being given to acetic acid.

To the Process

The reaction proceeds in principle according to the following reaction equation.

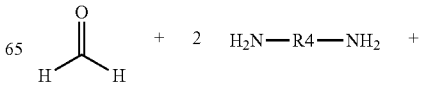

-continued

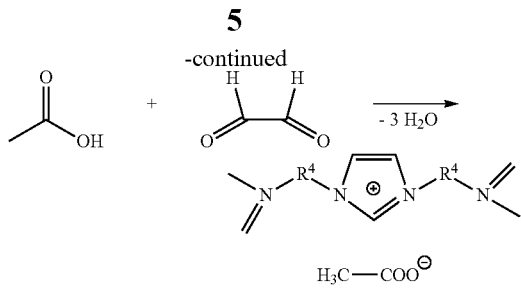

Here, 1 mol of aldehyde, 1 mol of a diamine, 1 mol of the protic acid and 1 mol of the α-dicarbonyl compound are used. In the polymer obtained, the imidazolium groups are joined to one another by the diamine.

High molecular weights should be achieved when the compounds are used in equimolar amounts.

It has been found, however, that the formation of polymeric, ionic imidazolium compounds of high molecular weight is improved with a molar ratio of the α-dicarbonyl compound to the oligoamine of greater than 1; hence a molar excess of the α-dicarbonyl compound is used.

In a preferred embodiment the molar ratio the of α-dicarbonyl compound to the oligoamine is from 1.001:1 to 2:1, more preferred is a ratio of 1.01:1 to 1.5:1.0; particularly preferred is a ratio of the of α-dicarbonyl compound to the oligoamine of 1.01:1 to 1.2:1.0.

It is preferred that the aldehyde is used in molar excess as well, the molar ratio of the aldehyde to the oligoamine being greater than 1 as well.

In a preferred embodiment the molar ratio the of the aldehyde to the oligoamine is from 1.001:1 to 2:1, more preferred is a ratio of 1.01:1 to 1.5:1.0; particularly preferred is a ratio of the aldehyde to the oligoamine of 1.01:1 to 1.2:1.0.

The reaction of the starting compounds is preferably carried out in water, a water-miscible solvent or mixtures thereof.

Water-miscible solvents are, in particular, protic solvents, preferably aliphatic alcohols or ethers having not more than 4 carbon atoms, e.g. methanol, ethanol, methyl ethyl ether, tetrahydrofuran. Suitable protic solvents are miscible with water in any ratio (at 1 bar, 21° C.).

The reaction is preferably carried out in water or mixtures of water with the above protic solvents. The reaction is particularly preferably carried out in water.

During the reaction the pH value is preferably 1 to 7, more preferably 1 to 6 and in particular 3 to 5. The pH value may be kept or adjusted by any suitable manner, for example by adding acids or suitable puffer systems. In a preferred embodiment an excess of the protic acid which is used as starting material may be used to adjust the pH value.

In a preferred embodiment the molar ratio of the protic acid to the oligoamine may be from 1.05:1 to 10:1, in particular from 1.2:1 to 5:1, respectively 1.5:1 to 5:1.

The reaction is a semi-batch process wherein the protic acid is placed in the reactor first. The oligoamine or the aldehyde and α-dicarbonyl compound or the oligoamine, the aldehyde and α-dicarbonyl compound are then fed to the protic acid.

According to the first alternative the aldehyde and the α-dicarbonyl compound may be placed into the reactor together with the protic acid; the oligoamine is fed to the mixture comprising the aldehyde, the α-dicarbonyl compound and protic acid.

According to the second alternative the oligoamine may be placed into the reactor together with the protic acid; the aldehyde and the α-dicarbonyl compound are fed to the mixture comprising the oligoamine and protic acid.

According to the third alternative, which is the preferred alternative, the protic acid is placed in the reactor, only, and all other starting compounds, which are in particular the oligoamine, the aldehyde and the α-dicarbonyl compound are fed to the protic acid. In a preferred embodiment of the third alternative the α-dicarbonyl compound and the aldehyde are mixed beforehand and fed in together as a stream; the oligoamine is fed separately.

Preferably, the starting materials to be fed according to alternatives one to three (in particular the oligoamine, aldehyde and α-dicarbonyl compound in case of the third alternative) are fed to the protic acid in a rate that the temperature of the reaction mixture is kept below 60° C., in particular below 30° C. during the feed.

The reaction of the starting components can be carried out at, for example, pressures of from 0.1 to 10 bar, in particular atmospheric pressure, and, for example, at temperatures below 100° C., in particular below 50° C., particularly preferably below 40° C., respectively 30° C. The reaction is exothermic and cooling is required. After the exothermic reaction the temperature may be raised and the reaction mixture may be stirred and kept at a higher temperature to complete the reaction.

The reaction can be carried out in any reaction vessels, i.e. in a stirred vessel.

After the polycondensation reaction has been carried out, the polymeric compounds obtained can precipitate from the solution or remain in solution. Preferably solutions of the polymeric ionic imidazolium compounds are obtained.

The polymeric compounds can also be separated off from the solutions by customary methods. In the simplest case, the solvent, e.g. water, can be removed by distillation or by spray drying.

The number average molecular weight Mn of the polymeric, ionic imidazolium compounds obtained by the process is higher than by the process according to WO 2010/072571.

Mn may be for example greater than 20.000, in particular greater than 30.000, respectively greater than 50.000 g/mol. In general Mn will not be higher than 500.000 g/mol.

The polydispersity (ratio of weight average molecular weight and number average molecular weight Mw/Mn) may have, for example, values of from 1.1 to 100, in particular from 1.5 to 20.

The molecular weight is determined by Size-exclusion chromatographie (SEZ) using polymaltotriose as standard and water comprising 0.02 mol/l formic acid and 0.2 mol/l KCl as effluent at a temperature of 35° C. of the column.

The process of the invention is an easy and cost-effective process to obtain polymeric compounds comprising imidazolium groups. A precipitation of solids from the reaction mixture during or after the reaction can be avoided. In addition, the process has high selectivity regarding such polymeric compounds and may give polymers of high molecular weight.

EXAMPLES

The molecular weight of the polymeric ionic compounds was determined by Size-exclusion chromatographie (SEZ) using polymaltotriose as standard and water comprising 0.02 mol/l formic acid and 0.2 mol/l KCl as effluent. The temperature of the column was 35° C., the injected volume 100 μL (μliter), the concentration 1.5 mg/mL and the flow rate 0.8 mL/min.

The weight average molecular weight (Mw), the number average molecular weight (Mn) and the polydispersity PDI (Mw/Mn) of the polymeric ionic compounds obtained are listed in the table.

Comparison Example 1 mol formaldehyde (49% aq. Solution), 1 mol glyoxal (40% aq. Solution) and 1 mol acetic acid dissolved in 4.5 mol of water are placed in flask. 1 mol of 1,4 diaminobutane (dissolved in 6.7 mol of water) are added at room temperature (ice bath cooling) to the reaction mixture. A white precipitate occurs during the addition, which dissolves again upon continued addition of the monomer. The reaction is stirred at 100° C. for 1-3 hours. An aqueous solution of the polymeric, ionic imidazolium compound is obtained, which was analyzed.

Example 1

1 mol acetic acid dissolved in 4.5 mol of water is placed in a flask. A mixture of 1 mol formaldehyde (49% aq. Solution) and 1 Mol glyoxal (40% aq. Solution) is added via a dropping funnel to the solution. In parallel, 1 mol of 1,4 diaminobutane (dissolved in 6.7 mol of water) is added to the solution via a separated dropping funnel. During addition of the monomers the reaction mixture is held at room temperature by ice bath cooling, no precipitate is observed. After completion of the addition the reaction mixture is heated to 100° C. for 1-3 hours. No precipitates have been observed during or after the reaction. An aqueous solution of the polymeric, ionic imidazolium compound is obtained, which was analyzed.

Example 2

2 mol acetic acid are placed in a flask. A mixture of 1 mol formaldehyde (49% aq. Solution) and 1 mol glyoxal (40% aq. Solution) are added via a dropping funnel to the solution. In parallel, 1 mol of molten hexamethylene diamine (~40° C.) is added to the solution via a separated dropping funnel. During addition of the monomers the reaction mixture is held at room temperature by ice bath cooling. After completion of the addition the reaction mixture is heated to 100° C. for 1-3 hours. An aqueous solution of the polymeric, ionic imidazolium compound is obtained, which was analyzed. No precipitates have been observed during or after the reaction.

Example 3

The procedure of example 2 has been repeated using 1.05 mol formaldehyde and 1.05 mol glyoxal. No precipitates have been observed during or after the reaction.

TABLE performance details and results of example 1 and comparison examples 1-3

| No. | Diamine | Formaldehyde | Glyoxal | Acetic acid | Mw | Mn | PDI | precipitate |
|---|---|---|---|---|---|---|---|---|
| comparison example | 1 mol 1,4-diaminobutane | 1 mol | 1 mol | 1 mol | 7870 | 2860 | 2.8 | yes |
| example 1 | 1 mol 1,4-diaminobutane | 1 mol | 1 mol | 1 mol | 5930 | 2300 | 2.6 | no |
| example 2 | 1 mol hexa-methylenediamin | 1 mol | 1 mol | 2 mol | 78670 | 26430 | 3.0 | no |
| example 3 | 1 mol hexa-methylenediamin | 1.05 mol | 1.05 mol | 2 mol | 278800 | 35330 | 7.9 | no |

The invention claimed is:

1. A process for preparing polymeric, ionic compounds comprising imidazolium groups, the process comprising reacting:
   an α-dicarbonyl compound,
   an aldehyde,
   at least one oligoamine, which is an amino compound having at least two primary amino groups,
   optionally a monoamine, which is an amino compound having only one primary amino group; and a
   protic acid,
   at a pressure of from 0.1 to 10 bar and at a temperature of less than 100° C.,
   wherein the protic acid is first placed in the reactor only and then the oligoamine, the aldehyde and α-dicarbonyl compound are fed to the protic acid in the reactor,
   wherein the protic acid and the oligoamine are in a molar ratio of from 1.05:1 to 10:1.

2. The process according to claim 1, wherein a pH value of the reaction solution is from 1 to 6.

3. The process according to claim 1 wherein a molar ratio of the α-dicarbonyl compound to the oligoamine is greater than 1.

4. The process according to claim 1, wherein a molar ratio of the aldehyde to the oligoamine is greater than 1.

5. The process according to claim 1, wherein the α-dicarbonyl compound is a compound of formula I:

R1-CO—CO—R2 wherein R1 and R2 are each, independently of one another, an H atom or an organic radical having from 1 to 20 carbon atoms.

6. The process according to claim 1, wherein the aldehyde is an aldehyde of formula II:

R3-CHO wherein R3 is an H atom or an organic radical having from 1 to 20 carbon atoms.

7. The process according to claim 1, wherein the aldehyde is formaldehyde.

8. The process according to claim 1, wherein the oligoamine is a compound of formula III:

(NH2 —)$_n$R4 wherein n is an integer greater than or equal to 2 and R4 is any n-valent organic radical.

9. The process according to claim 1, wherein the oligoamine is an aliphatic or aromatic diamine or triamine.

10. The process according to claim 1, wherein the oligoamine is a C2-C20-alkylenediamine.

11. The process according to claim 1, wherein the protic acid is an acid with a $pK_a$ greater than 1.

12. The process according to claim 1, wherein the protic acid is acetic acid.

13. The process according to claim 1, wherein the process is carried out in water, in a water-miscible solvent or a mixture thereof.

14. The process according to claim 1, wherein the carbonyl groups of the α-dicarbonyl compound and the aldehyde are in the form of a hemiacetal, an acetal, a hemiketal, or a ketal group.

15. The process according to claim 1, wherein the aldehyde is formaldehyde and the formaldehyde forms compounds that liberate formaldehyde.

* * * * *